US008150771B1

(12) United States Patent
Baram (10) Patent No.: US 8,150,771 B1
(45) Date of Patent: Apr. 3, 2012

(54) AUTOMATIC CHECK REORDERING

(75) Inventor: Andrew Baram, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 355 days.

(21) Appl. No.: 12/315,247

(22) Filed: Dec. 1, 2008

Related U.S. Application Data (63) Continuation-in-part of application No. 12/209,860, filed on Sep. 12, 2008, which is a continuation of application No. 10/747,583, filed on Dec. 29, 2003, now abandoned.

(51) Int. Cl.
G06Q 40/00 (2006.01)

(52) U.S. Cl. ............................................. 705/45; 705/35

(58) Field of Classification Search .................... 705/45, 705/35, 38, 39, 41; 235/375, 379
See application file for complete search history.

(56) References Cited

U.S. PATENT DOCUMENTS

| | | | |
|---|---|---|---|
| 3,333,869 A | 8/1967 | Alexander | |
| 4,014,566 A | 3/1977 | Cantrell et al. | |
| 4,845,486 A | 7/1989 | Knight et al. | |
| 5,305,199 A | 4/1994 | LoBiondo et al. | |
| 5,842,976 A | 12/1998 | Williamson | |
| 5,882,041 A | 3/1999 | Schara | |
| 5,903,881 A | 5/1999 | Schrader et al. | |
| 6,351,735 B1 | 2/2002 | Deaton et al. | |
| 6,418,416 B1 * | 7/2002 | Rosenberg et al. | 705/28 |
| 6,608,491 B2 | 8/2003 | Salmon, Jr. | |
| 6,760,414 B1 * | 7/2004 | Schurko et al. | 705/36 R |
| 7,019,859 B2 * | 3/2006 | Phillips et al. | 358/1.15 |
| 7,283,981 B2 * | 10/2007 | Solem | 705/42 |
| 7,654,447 B1 * | 2/2010 | Barth | 235/379 |
| 7,788,175 B1 | 8/2010 | Hadfield | |
| 2003/0046229 A1 | 3/2003 | Cresswell | |
| 2003/0135431 A1 * | 7/2003 | Schwartz et al. | 705/28 |
| 2004/0138975 A1 | 7/2004 | Engel et al. | |
| 2004/0236647 A1 * | 11/2004 | Acharya | 705/30 |
| 2005/0131820 A1 * | 6/2005 | Rodriguez et al. | 705/42 |
| 2005/0182725 A1 * | 8/2005 | Modica | 705/45 |

OTHER PUBLICATIONS

"Just-in-time (business)"; Wikipedia, the free encyclopedia; downloaded definition Jan. 31, 2011; pp. 1-9.*

Taylor, Jocelyn P.; "Check Fraud: Preventive Measures for Businesses"; Journal of Cash Management, v12,n1; Jan./Feb. 1992; pp. 1-17.*

(Continued)

*Primary Examiner* — Ella Colbert
(74) *Attorney, Agent, or Firm* — Robert J. Pugh; K&L Gates LLP (57) ABSTRACT

Various embodiments are directed to computer implemented methods of automatically reordering checks for an account utilizing checks. The methods may comprise determining a number of checks written on the account from a most recent check order. The number of checks written on the account from the most recent check order comprises a number of checks cleared on the account and a number of stop payment orders made on the account. The methods may also comprise determining a check usage rate, which may be proportional to a number of checks written on the account per unit time. The methods may additional comprise determining a time-to-exhaustion considering the number of checks written on the account and the check usage rate. Conditioned upon the time-to-exhaustion being below a predetermined threshold, an order of new checks directed to the customer may be initiated.

21 Claims, 7 Drawing Sheets

OTHER PUBLICATIONS

"History of just-in-time inventory—Google Search," www.google.com, search terms "history+of+just-in-time+inventory," search run on May 11, 2011.

"Intuit Quicken Setup Guide, Getting Maximum Benefit With Minimum Effort," 2001.

U.S. Appl. No. 12/209,860, filed Sep. 12, 2008.

"Check Reorder Express : Login," printed from https://checkreorderexpress.com/prodreorder/reorder_form.cfm, Internet site, accessed on Oct. 28, 2003, 1 page.

Nexis® search, printed from https://w3.nexis.com/new/history/deleterecentsearch.do?=1, Internet site, accessed on Jan 12, 2011, 1 page.

"Intuit Checks, Forms & Supplies-Help Quickbooks 2002" printed from http://www.intuitmarket.intuit.com/fsg/help/help_page.asp?file=usage/quickbooks.htm, Internet site, accessed on Feb. 11, 2011, 3 pages.

Malcolm Newell, "Cheques and balances," *Nationwide News Pty Limited*, Sep. 16, 1990, 1 page.

Jeanne O'Brien, "Hibernia fortifies Web banking with target marketing function," *Bank Systems & Technology*, v37, n3, Mar. 2000, printed from https://www.dialogclassic.com/MainFrame.jsp, Internet site, accesses on Sep. 20, 2011, 2 pages.

Business Wire, "Wells Fargo Idaho: Wells Fargo schedules Northwest account conversions," Nov. 7, 1996, printed from htlps://www.dialogclassic.com/MainFrame.jsp, Internet site, accessed on Sep. 20, 2011, 2 pages.

*Item Processing Report*, ACOM Financial Documents Division Announces On-Line check Ordering for Bank Customers, v 13, n24, Dec. 5, 2001, printed from http;//www.dialogclassic.com/Main/Frame.jsp, Internet site, accessed on Sep. 20, 2011, 1 page.

Office Action dated Aug. 18, 2010 for U.S. Appl. No. 12/209,860, filed Sep. 12, 2008.

Office Action dated Feb. 16, 2011 for U.S. Appl. No. 12/209,860, filed Sep. 12, 2008.

Notice of Allowance dated Sep. 23, 2011 for U.S. Appl. No. 12/209,860, filed Sep. 12, 2008.

* cited by examiner

AUTOMATIC CHECK REORDERING

CROSS-REFERENCE TO RELATED APPLICATIONS

This application is a continuation-in-part of U.S. patent application Ser. No. 12/209,860 filed on Sep. 12, 2008, which is incorporated herein by reference in its entirety, which is a continuation of U.S. patent application Ser. No. 10/747,583 filed on Dec. 29, 2003, now abandoned, which is also incorporated herein by reference in its entirety.

BACKGROUND

When a customer of a financial institution begins to run out of checks, the customer traditionally has had several ways to order another supply of checks. Many customers travel to a branch office of the financial institution and place the order with a branch office employee, or call a customer contact center of the financial institution and place the order with a customer contact center employee. However, reordering checks in either of these ways is not an efficient use of the customers' or the employees' time, and relies on the customer to initiate the check reorder.

Another way to reorder checks to access a check reorder website to place an order for an additional supply of checks. The customer can place the order by providing and submitting certain information such as the account number, routing number, etc. Although reordering checks in this manner eliminates the direct involvement of the employees of the financial institution, the process still relies on the customer to initiate the check reorder. In view of these issues, improved methods and systems for automatic check reordering are needed.

DETAILED DESCRIPTION

As used herein, the term "check" means any negotiable instrument drawn against deposited funds, to pay a specified amount to a specific entity upon demand.

Various embodiments are directed to methods and systems for automatically reordering checks for customers of financial institutions. New orders may be initiated automatically based on the customers' check usage. For example, in various embodiments, a new order may be initiated when the customer has a predetermined number of checks remaining. Also, new check orders may be initiated when the customer has used a predetermined percentage of their previous check order. In some embodiments, a new check order may be initiated when, based on usage rate, a customer has a predetermined amount of time remaining before running out of checks. Various other features may be included. For example, in various embodiments, a notice of an imminent check order may be sent to a customer at a predetermined threshold occurring before a new order is initiated (e.g., a predetermined number of checks remaining, percentage of checks remaining, time-to-exhaustion, etc.).

Figure 1:
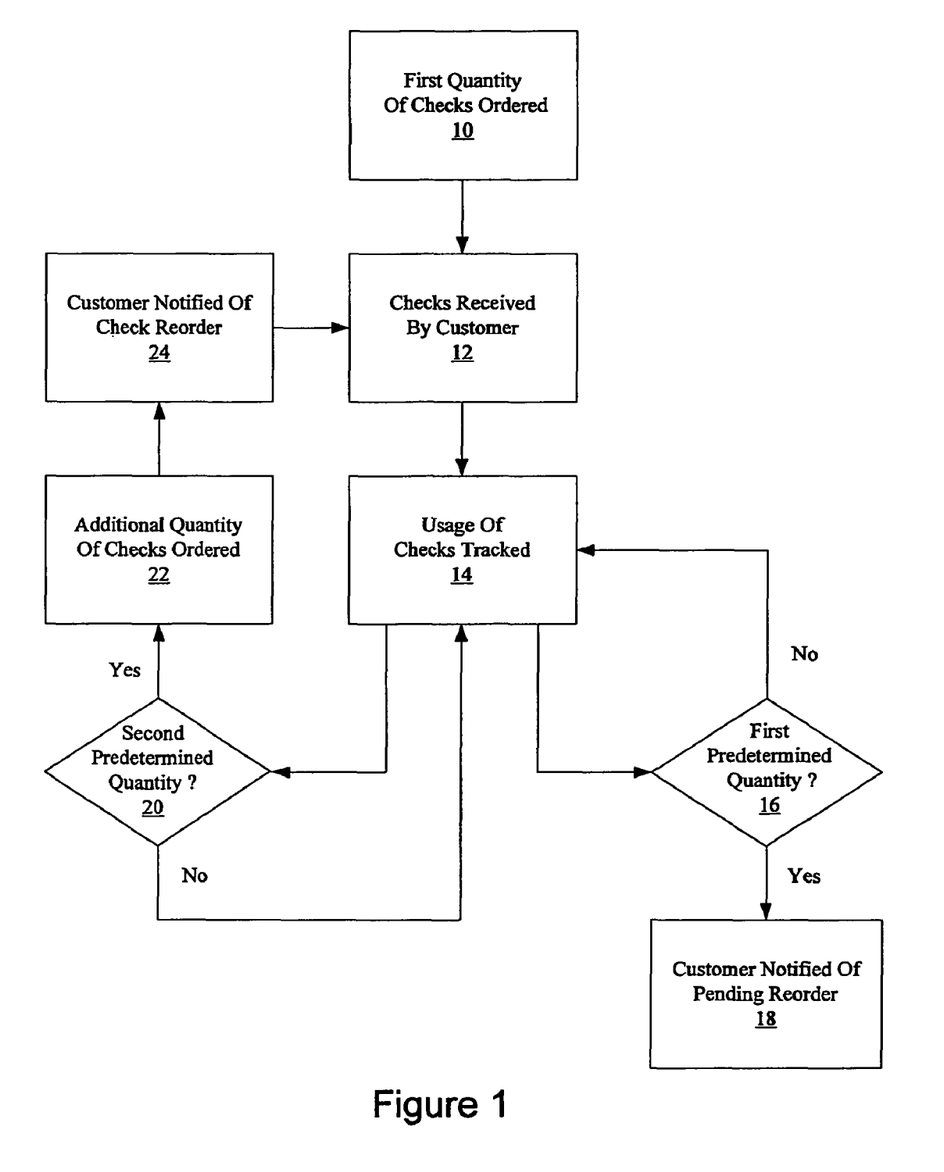
FIG. 1 illustrates a process flow of a method for reordering checks according to various embodiments.

FIG. 1 illustrates a process flow of a method for reordering checks according to various embodiments of the disclosed invention. The process begins at block 10, where a first quantity of checks is ordered for a customer. The first quantity of checks ordered for the customer may be an initial order or a reorder of checks for the customer. The customer may be a customer of, for example, a financial institution, and the first quantity of checks may be any quantity such as, for example, one-hundred, two-hundred, or four-hundred checks. The customer may request the financial institution to order the first quantity of checks or the financial institution may order the first quantity of checks when a checking account is opened for the customer.

When the first quantity of checks is ordered, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The first quantity of checks may be printed by the financial institution or by a third-party check printer. After the first quantity of checks is printed, the checks may be delivered directly to the customer.

From block 10, the process advances to block 12, where the customer receives the first quantity of checks and may begin to use the first quantity of checks to draw against funds deposited with the financial institution. From block 12, the process advances to block 14, where the financial institution tracks the customer's usage of the first quantity of checks. To facilitate the tracking of the first quantity of checks, the financial institution may identify the customer account number and the check number for each check that has been processed. The checks may be processed by the financial institution or by a third-party processor. By tracking the usage of the first quantity of checks, the financial institution can determine a quantity of the first quantity of checks that has been processed. The quantity can be expressed in the form of a number or percentage of the first quantity of checks that has been processed.

As the usage of the first quantity of checks is being tracked at block 14, a determination is made at block 16 as to whether or not the quantity of the first quantity of checks that has been processed has reached a first predetermined quantity. The first predetermined quantity can be individualized for each customer, and can represent a particular number or percentage of the first quantity of checks that has been processed. For example, the first predetermined quantity for a particular customer may represent 70% of the first quantity of checks. By tracking the usage of the first quantity of checks at block 14, the financial institution can determine a difference between the first predetermined quantity and the quantity of the first quantity of checks that has been processed.

When the quantity of the first quantity of checks that has been processed reaches the first predetermined quantity, the process advances from block 16 to block 18, where the customer is notified that a check reorder will soon be placed for the customer. The customer may be notified of the pending reorder via a notification communicated to the customer via regular mail, electronic mail, telephone, facsimile, etc.

After a determination has been made at block 16 that the quantity of the first quantity of checks that has been processed has reached the first predetermined quantity and while the usage of the first quantity of checks is being tracked at block 14, a determination is also made at block 20 as to whether or not the quantity of the first quantity of checks that has been processed has reached a second predetermined quantity.

The second predetermined quantity is greater than the first predetermined quantity. Thus, the first predetermined quantity can be represented as a portion of the second predetermined quantity. The second predetermined quantity can be individualized for each customer, and can represent a particular number or percentage, of the first quantity of checks that has been processed. For example, the second predetermined quantity for a particular customer may represent 80% of the first quantity of checks. By tracking the usage of the first quantity of checks at block 14, the financial institution can determine a difference between the second predetermined quantity and the quantity of the first quantity of checks that has been processed. Based on the usage rate of each particular customer, the first and second predetermined quantities can be raised or lowered at any time.

When the quantity of the first quantity of checks that has been processed reaches the second predetermined quantity, the process advances from block 20 to block 22, where a second quantity of checks is ordered for the customer. The second quantity of checks may be more than, less than or the same as the first quantity of checks. The order may be placed with the same entity that the order for the first quantity of checks was received by at block 10. However, before placing the order, the mailing address of record for the customer may be checked to verify that the address is a valid address. For example, the check vendor or printer may compare its address for the customer with at least one customer address maintained by the financial institution. If the addresses match, it may indicate that the customer address is correct. If the addresses do not match, a more detailed investigation may be undertaken. For example, multiple systems of the financial institution and/or the check printer/vendor may be searched and a suitable address may be selected (e.g., the most recent address). If no suitable address is identified, the order may be cancelled.

When the order is placed for the second quantity of checks, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The second quantity of checks may be printed by the financial institution or by a third-party check printer. After the second quantity of checks is printed, the additional checks may be delivered directly to the customer.

From block 22, the process advances to block 24, where the customer is notified that additional checks were ordered for the customer. The customer may be notified of the order via a notification communicated to the customer via regular mail, electronic mail, telephone, facsimile, etc.

From block 24, the process returns to block 12, where the customer receives the second quantity of checks and may begin to use the second quantity of checks to draw against funds deposited with the financial institution. From block 12, the process advances to block 14, where the financial institution tracks the customer's usage of the second quantity of checks. To facilitate the tracking of the second quantity of checks, the financial institution may identify the customer account number and the check number for each check that has been processed. The checks may be processed by the financial institution or by a third-party processor. By tracking the usage of the second quantity of checks, the financial institution can determine a quantity of the second quantity of checks that has been processed. The quantity can be expressed in the form of a number or percentage of the second quantity of checks that has been processed.

As the usage of the second quantity of checks is being tracked at block 14, a determination is made at block 16 as to whether or not the quantity of the second quantity of checks that has been processed has reached a first predetermined quantity. The first predetermined quantity can be individualized for each customer, and can represent a particular number or percentage of the second quantity of checks that has been processed. For example, the first predetermined quantity for a particular customer may represent 70% of the second quantity of checks. By tracking the usage of the second quantity of checks at block 14, the financial institution can determine a difference between the first predetermined quantity and the quantity of the second quantity of checks that has been processed.

When the quantity of the second quantity of checks that has been processed reaches the first predetermined quantity, the process advances from block 16 to block 18, where the customer is notified that another check reorder will soon be placed for the customer. The customer may be notified of the pending reorder via a notification communicated to the customer via regular mail, electronic mail, telephone, facsimile, etc.

After a determination has been made at block 16 that the quantity of the second quantity of checks that has been processed has reached the first predetermined quantity and while the usage of the second quantity of checks is being tracked at block 14, a determination is also made at block 20 as to whether or not the quantity of the second quantity of checks that has been processed has reached a second predetermined quantity.

The second predetermined quantity is greater than the first predetermined quantity. Thus, the first predetermined quantity can be represented as a portion of the second predetermined quantity. The second predetermined quantity can be individualized for each customer, and can represent a particular number or percentage of the second quantity of checks that has been processed. For example, the second predetermined quantity for a particular customer may represent 80% of the second quantity of checks. By tracking the usage of the second quantity of checks at block 14, the financial institution can determine a difference between the second predetermined quantity and the quantity of the second quantity of checks that has been processed. Based on the usage rate of each particular customer, the first and second predetermined quantities can be raised or lowered at any time.

When the quantity of the second quantity of checks that has been processed reaches the second predetermined quantity, the process advances from block 20 to block 22, where a third quantity of checks is ordered for the customer. The third quantity of checks may be more than, less than or the same as the first and/or second quantity of checks. The order may be placed with the same entity that the order for the first and/or second quantity of checks was received by at block 10. However, before placing the order, the mailing address of record for the customer may be checked to verify that the address is a valid address.

When the order is placed for the third quantity of checks, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The third quantity of checks may be printed by the financial institution or by a third-party check printer. After the third quantity of checks is printed, the additional checks may be delivered directly to the customer.

From block 22, the process advances to block 24, where the customer is notified that additional checks were ordered for the customer. The customer may be notified of the order via a notification communicated to the customer via regular mail, electronic mail, telephone, facsimile, etc.

From block 24, the process again returns to block 12, where the customer receives the third quantity of checks and may begin to use the third quantity of checks to draw against funds deposited with the financial institution. The process flow sequence described in blocks 12-24 may be repeated any number of times. In addition, the above-described check reorder method may be performed concurrently for any number of customers.

Figure 2:
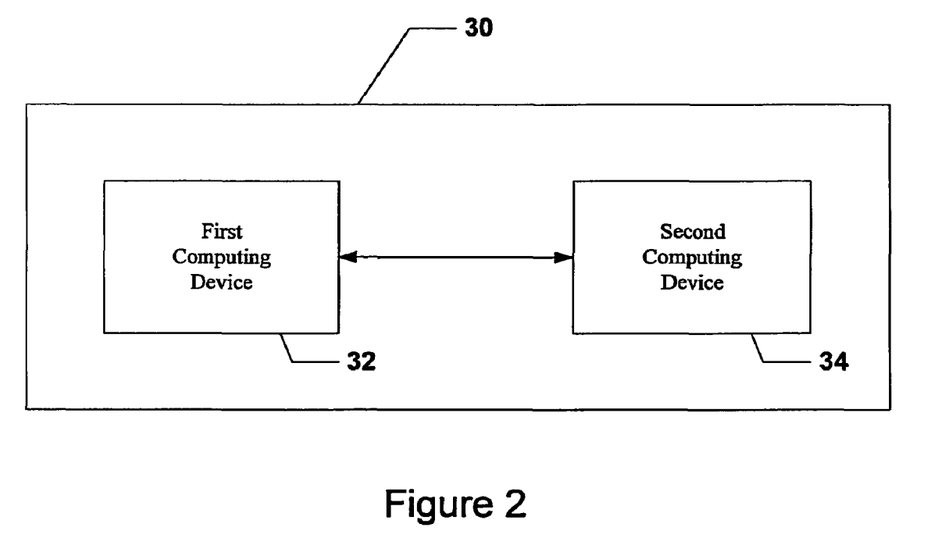
FIG. 2 illustrates a system for reordering checks according to various embodiments.

FIG. 2 illustrates a system 30 for reordering checks according to various embodiments. The system 30 may include a first computing device 32 and a second computing device 34 in communication with the first computing device 32 via, for example, one or more delivery systems for directly or indirectly connecting the first computing device 32 and the second computing device 34. Examples of such delivery systems include, but are not limited to, a local area network (LAN), a metropolitan area network (MAN), a wide area network (WAN), the Internet, an Intranet, an Extranet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, firewalls, routers, switches, adapters, sockets, and wired or wireless data pathways, configured to direct and/or deliver data. The first computing device 32 may be associated with the financial institution and the second computing device 34 may be associated with the financial institution or an entity such as a third-party check printer.

The first computing device 32 may be for tracking usage of a first quantity of checks and ordering a second quantity of checks when a predetermined quantity of the first quantity of checks has been processed. The computing device 32 may further be for generating a first customer notification when a predetermined portion of the first quantity of checks has been processed and for generating a second customer notification when the predetermined quantity of the first quantity of checks has been processed. The computing device 32 may further be for tracking usage of the second quantity of checks and ordering a third quantity of checks when a predetermined quantity of the second quantity of checks has been processed.

The computing device 32 may perform the above-described actions automatically and may perform the actions for any number of customers of the financial institution. Although the computing device 32 is shown as a single unit in FIG. 2 for purposes of convenience, it should be recognized that the computing device 32 may comprise a number of distributed computing devices, inside and/or outside the administrative domain.

In order to perform the actions described hereinabove, the computing device 32 may execute a series of instructions. The instructions may be software code to be executed by the computing device 32. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written using procedural programming techniques, or in Java or C++ using object-oriented programming techniques.

Various embodiments may be directed to systems and methods for automatically reordering checks for an account based on an estimate of how much time will elapse before the account customer uses all of their remaining checks. The time that will elapse before the account customer uses all of their remaining checks may be referred to as the time-to-exhaustion. The time-to-exhaustion may be expressed in any suitable units (e.g., days, weeks, months, etc.) and may be found by monitoring the number of checks that a customer has remaining as well as the rate at which the customer writes checks (e.g., a number of checks per unit time). Notices and reorders may then be initiated based on the time-to-exhaustion. For example, according to various embodiments, when the time-to-exhaustion reaches seventy-five days, a notice may be sent to the account customer indicating that new checks will soon be ordered. Also, for example, when the time-to-exhaustion reaches sixty days, new checks may be ordered. The timing of notices and new check orders may vary and may be a predetermined value for each account and/or may be set by the customer.

Figure 3:
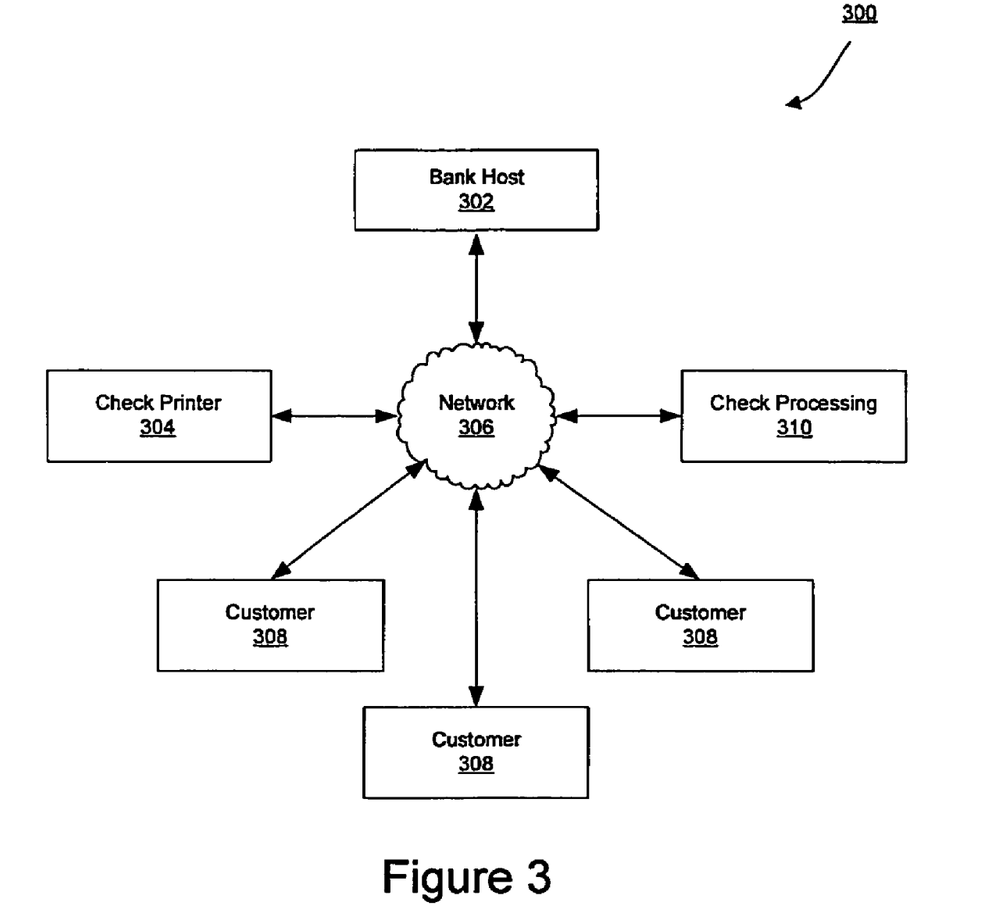
FIG. 3 illustrates another embodiment of a system for reordering checks.

FIG. 3 illustrates another embodiment of a system 300 for reordering checks. The system 300 may be used with any of the reorder methods described herein including, for example, the process flow illustrated by FIG. 1 above, as well as the methods described herein below. The system 300 may comprise a bank host system 302, a check printer system 304, a check processing system 310 and a plurality of customer systems 308. The various systems 302, 304, 310, 308 may comprise one or more computers or computer devices. In addition, the various systems 302, 304, 310, 308 may be in communication with one another via a network 306. The network 306 may comprise any suitable kind of communication network including, for example, a local area network (LAN), a metropolitan area network (MAN), a wide area network (WAN), the Internet, an Intranet, an Extranet, the Web, a telephony network (e.g., analog, digital, wired, wireless, PSTN, ISDN, or xDSL), a radio network, a television network, a cable network, a satellite network, and/or any other wired or wireless communications network configured to carry data.

The bank host system 302 may manage the automatic check reordering for various customer accounts. For example, the bank host system 302 may receive reorder set-up information from the various customer systems 308. Set-up information may comprise various information about accounts, check type, etc. that may be necessary for the bank host system 302 to manage automatic check reordering. According to various embodiments, set-up information may also include thresholds in numbers of checks remaining and/or time-to-exhaustion at which the bank host system 302 will send reminders and/or reorder checks. The bank host system 302 may also receive information about checks that have been processed from the check processing system 310. Orders for new checks may be presented to the check printer system 304, which may cause an order of checks to be printed and provided to the appropriate customer (e.g., via United States Mail or another suitable delivery service).

The check processing system 310 may be a proprietary system operated by the financial institution implementing the bank host 302, or may be a third-party system. In use, the check processing system 310 may process checks that are presented for payment. This may include traditional checks presented in paper form. It may also include electronic checks, including electronic checks which are originally presented in paper form (e.g., at a retail location) or electronic checks that are presented in on-line applications (e.g., via an Internet retailer).

Customer systems 308 may be any sort of system allowing a customer to access bank account information. The customer systems 308 may be in contact with the bank host system 302 and/or with other components 304, 310 of the system 300 via a secured, encrypted connection, for example, via the network 306. According to various embodiments, customer systems 308 may comprise bank owned or operated devices and/or customer owned devices. Bank owned and/or operated devices may include, for example, dedicated automatic teller machines (ATM's). Customer systems 308 may also include customer-owned devices from which customers may make secure connections with the bank host 302. For example, personal computers, mobile phones, personal digital assistants, etc., may serve as customer systems 308.

Figure 4:
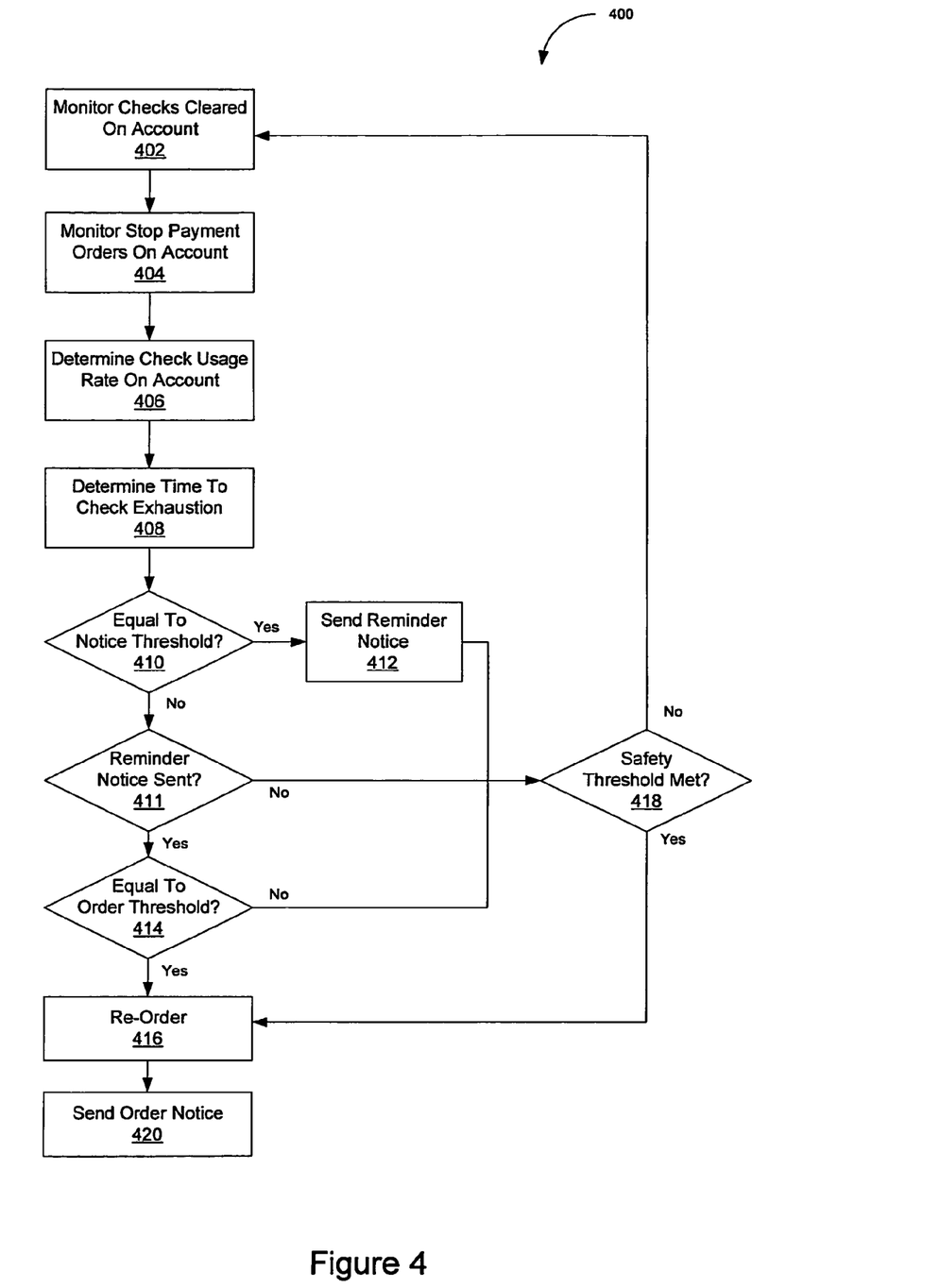
FIG. 4 illustrates one embodiment of a process flow for automatically reordering checks.

FIG. 4 illustrates one embodiment of a process 400 flow for automatically reordering checks for a given account. Although the process flow 400 describes automatically reordering checks for a single account, it will be appreciated that the bank host 302 may execute the process flow 400 for multiple accounts simultaneously. At box 402, the checks cleared on the account may be monitored. This action may be performed by the bank host 302 directly or, for example, may be performed by the check processing system 310 and communicated to the bank host 302 either automatically or in response to a query. According to various embodiments, monitoring the checks cleared on an account may comprise monitoring the check number of the most recently cleared check, and/or monitoring the quantity of checks that have been cleared since a last reorder. Monitoring the quantity of checks that have been cleared may make it easier to account for checks that do not carry the proper chronological number. For example, it may allow the bank host 302 to account for checks written out of order by the customer. It may also allow the bank host 302 to account for electronically processed checks or other checks that are presented for payment without an indication of their original check number.

Also, according to various embodiments, monitoring the checks cleared on the account may comprise monitoring the checks cleared on the account that are part of a most recent check order. For example, the bank host 302 may determine a number of checks that have been cleared since the customer received the most recent check order. The point at which the customer begins writing checks from the most recent order may be determined in any suitable way. For example, the date of the most recent order and a check usage rate may be used to determine when the customer completely exhausts the checks received from a previous order and begins using checks from the most recent order. Also, the date may be estimated by adding a predetermined value to the date on which the most recent order was made.

At box 404, stop payment orders on the account may be monitored. This action may be performed by the bank host 302 directly or may be performed, for example, by the check processing system 310 and communicated to the bank host 302 either automatically or in response to a query. It will be appreciated that when a customer places a stop-payment order for a check written on an account, the check may never be processed according to normal procedures. Nonetheless, such checks reduce the number of blank checks available to the customer. Accordingly, monitoring the stop payment orders on an account in conjunction with the total number of checks cleared on the account may provide an indication of the total number of checks written on the account.

At box 406, the bank host 302 may determine a check usage rate on the account. The check usage rate may be proportional to a number of checks written per unit time. Any suitable time unit may be used to determine the check usage rate. For example, the check usage rate may be determined since the most recent check reorder. In this case, the rate may be found by taking the total number of checks written on the account divided by the time that has elapsed since the most recent check order or reorder. In some embodiments, check usage rates may be found over smaller units of time including, for example, the most recent week, the most recent month, etc. This may allow the process to account for changes in the check usage rate that may occur between orders. For example, a customer may configure a number of bills to be paid on-line or according to another check-less method. This may greatly reduce the customer's check usage rate. Likewise, a customer may temporarily pay utilities and other bills with checks (e.g., while setting up on-line payments at a new apartment or house). This may temporarily increase the customer's check usage. Finding the check usage rate over a week or a month may allow the process to take into account such quick and/or temporary changes in check usage.

At box 408, the bank host system 302 may determine the time-to-exhaustion. The time-to-exhaustion may be calculated by multiplying the check usage rate by a number of remaining checks. The number of remaining checks may be found based on the number of checks cleared monitored at box 402 and the number of stop payment requests monitored at box 404.

At decision 410, the bank host system 302 may determine whether the time-to-exhaustion is equal to a notice threshold. The notice threshold may be a predetermined time-to-exhaustion at which the bank host system 302 may notify the customer that an automatic reorder is imminent. For example, the notice threshold may be equal to seventy-five days, though any suitable value may be used. If the notice threshold has been reached, the bank host system 302 may send the reminder notice to the customer at box 412. The reminder notice may be telephone, letter, e-mail, text message or other suitable communication. The reminder notice may inform the customer that a new order for checks is about to be automatically placed on the customer's behalf. The notice may also provide an indication of when the new order will be placed. For example, the reminder notice may indicate that, at the customer's current check usage rate, the new order will be placed in a set number of days, weeks, etc. Also, for example, the reminder notice may indicate that, at the customer's current check usage rate, the new order will be placed after a set number of checks are written/processed, etc. In this way, the customer may be given an indication of when a reorder will occur. According to various embodiments, sending of the reminder notice may be optional.

If at decision 410, it is determined that no reminder notice is required (e.g., because a reminder notice has already been sent or because the notice threshold has not yet been reached), then the bank host 302 may determine at decision 411 whether a reminder notice has already been sent. If so, then, at decision 414, the bank host 302 may determine current time-to-exhaustion is equal to or greater than the order threshold. The order threshold may be a time-to-exhaustion below which a new order is placed. If the time-to-exhaustion is equal to or less than the order threshold, then the bank host 302 may direct a reorder at box 416. Directing a reorder may involve sending an instruction to the check printer 304, which may generate and ship a new order of checks to the customer. An order notice may be sent at box 420. The order notice may be sent by any suitable communication method including, for example, by telephone, e-mail, letter, text message, etc. The order notice may indicate to the customer that a new order has been placed and that the customer should expect new checks by the selected delivery method in the near future.

According to various embodiments, the process flow 400 may also have a safety threshold. The safety threshold may represent a minimum number of checks remaining for a customer. If the number of checks remaining drops below the safety threshold, then the bank host 302 may reorder checks for the customer, even if the time-to-exhaustion is above the order threshold. For example, a customer who has a low check usage rate may go down to an unacceptably low number of checks remaining before the order threshold time-to-exhaustion is reached. Accordingly, if the safety threshold number of checks (e.g., one book, a predetermined number of checks, etc.) is reached, then new checks may be ordered. Referring to the process flow 400, it may be determined at decision 418 whether the customer's remaining number of checks is at and/or below the safety threshold. If so, then a reorder may be initiated at box 416, for example, as described above.

According to various embodiments, information about the automatic check reorder process may be provided to customers via suitable user interfaces. The user interfaces may be served (e.g., via the bank host 302) to various customer systems 308. The automatic check reorder information provided by the user interfaces may include, for example, indications of a portion of the current order that has been used and a portion that is remaining (e.g., a number of checks, a percentage, etc.) and indications of when a new reorder will be initiated (e.g., after n additional checks have cleared, in y days, etc.). The customer may also be provided with functionality to setup and/or disable the automatic reorder service for one or more accounts.

Figure 5:
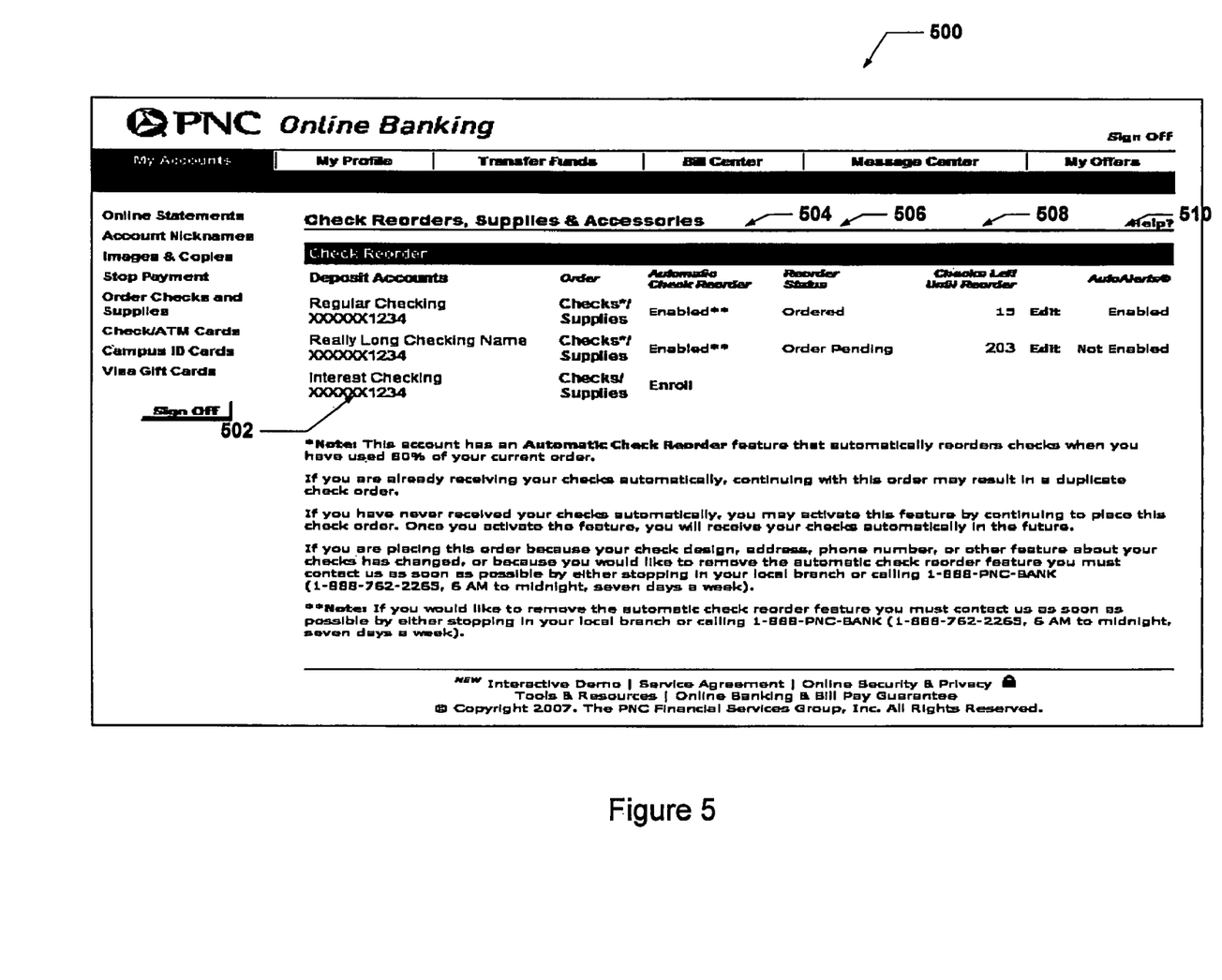
FIG. 5 illustrates one embodiment of a user interface showing an account summary screen.

FIGS. 5-9 illustrate user interfaces that may be served to the customer, according to various embodiments, to facilitate the process of setting up automatic check reordering. The various interfaces may be served, for example, by the bank host system 302 and may be provided to a customer, for example, via a customer system 308. FIG. 5 illustrates one embodiment of a user interface showing an account summary screen 500. A column 502 lists eligible accounts (e.g., accounts with available checks) held by the customer. Each account may be identified by a name and an account number. A column 504 shows, for each account, the status of an automatic check reorder service. For example, the status may be "enabled" or "enroll." If an account's status is "enabled," it may indicate that the automatic check reorder check reorder feature has already been configured for that account. If an account's status is "enroll," it may indicate that the automatic reorder feature has not be enabled for the account. A column 506 may indicate for each account its reorder status (e.g., if automatic reorder has been enabled). For example, the column 506 may indicate that new checks have been ordered, or that an order is pending. A column 508 may provide an indication, of how soon a reorder will occur (e.g., after how many checks have been written, after how much time has passed, etc.). A column 510 may indicate whether alerts have been enabled and allow the customer to edit an alert status. For example, the customer may determine whether the reminder notices and order notices described above are sent.

Figure 6:
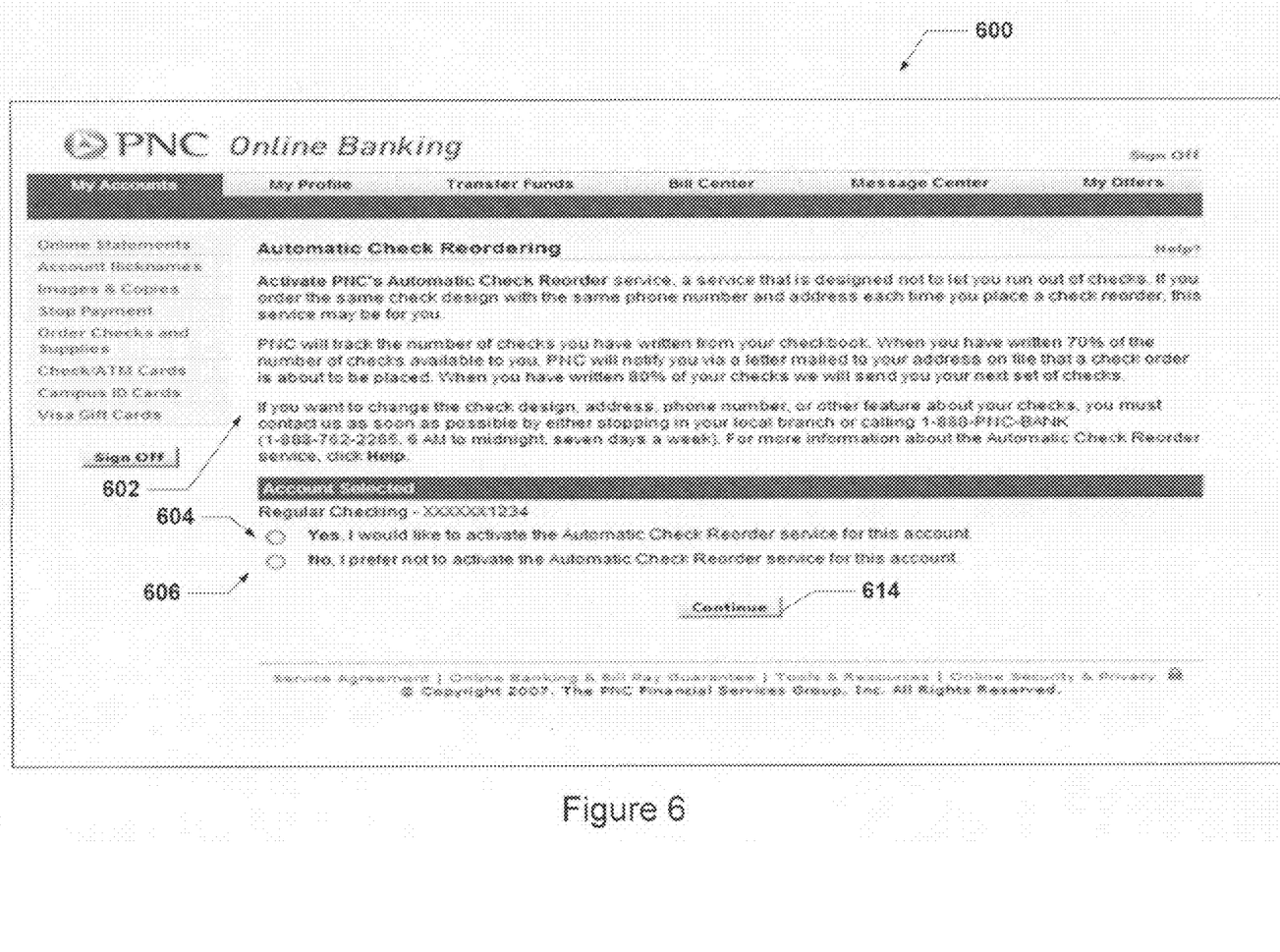
FIG. 6 illustrates one embodiment of a user interface showing an automatic reorder set-up screen.
Figure 7:
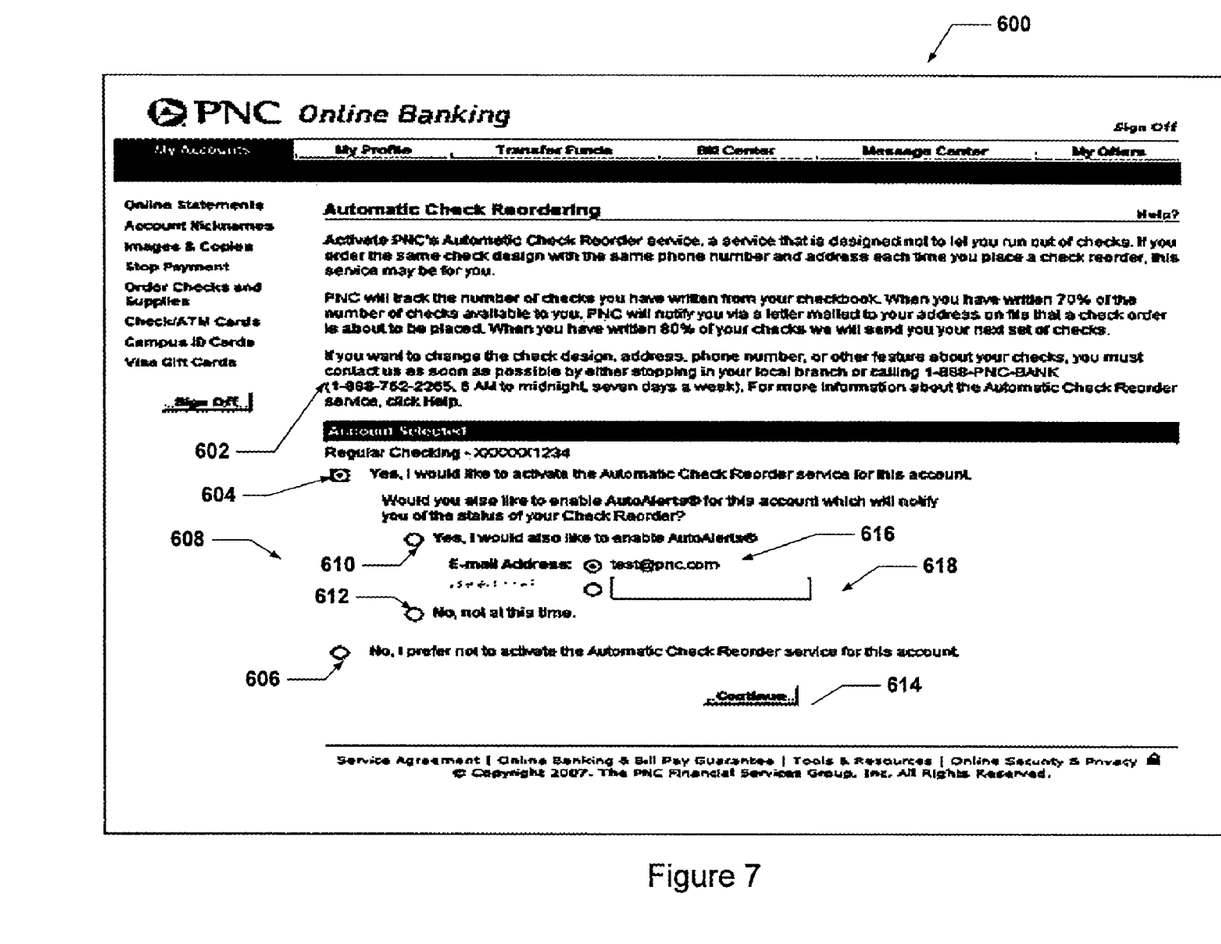
FIG. 7 illustrates one embodiment of the user interface of FIG. 6 showing the auto alert field.

To setup automatic check reordering for a given account, the customer may select the account, for example, by using a cursor to select one of the accounts listed on the user interface 500. FIG. 6 illustrates one embodiment of a user interface showing an automatic reorder set-up screen 600. The screen 600 may comprise an information field 602 that may provide information about how the automatic check reordering process works. Selection fields 604 and 606 may allow the customer to determine whether they would like to activate the automatic check reorder service. Selecting field 606 may end the setup process (e.g., by reverting the user back to the screen 500 illustrated above). Selecting the field 606 may cause the screen to display an additional auto alert field 608. FIG. 7 illustrates one embodiment of the user interface of FIG. 6 showing the auto alert field 608. The auto alert field 608 may allow the customer to request auto alerts, such as, for example, the reminder notice and the order notice described above. Field 608 may comprise sub-fields 612 and 610. The customer may select field 612 to indicate that that they do not want auto alerts. The customer may select field 610 to indicate that they do want to receive auto alerts. If field 610 is selected, the customer may select field 616 to have the auto alerts sent to an e-mail, other address and/or phone number known to the bank host system 302, or may select field 618 to enter a new e-mail, other address or phone number. Upon completion of reorder setup, the customer may select the continue button 614, which may cause the screen 500 to be re-displayed in a form that is updated to indicate the setup and/or changes just completed.

While several embodiments of the disclosed invention have been described, it should be apparent, however, that various modifications, alterations and adaptations to those embodiments may occur to persons skilled in the art with the attainment of some or all of the advantages of the disclosed invention. For example, the usage of a particular quantity of checks may be tracked at block 14 of FIG. 1 even after the quantity of the particular quantity of checks that has been processed exceeds the second predetermined quantity, and the actions described at blocks 22 and 24 may occur concurrently. It is therefore intended to cover all such modifications, alterations and adaptations without departing from the scope and spirit of the disclosed invention as defined by the appended claims.

It can also be appreciated that certain process aspects described herein may be performed using instructions stored on a computer-readable memory medium or media that direct a computer or computer system to perform process steps. A computer-readable memory medium may include, for example, memory devices such as diskettes, compact discs of both read-only and read/write varieties; optical disk drives, and hard disk drives. A computer-readable medium may also include memory storage that may be physical, virtual, permanent, temporary, semi-permanent and/or semi-temporary.

A "computer," "computer system," "host," "engine," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims. for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

What is claimed is:

1. A computer implemented method of automatically reordering checks for a plurality of accounts utilizing checks, the method comprising:
    determining, using a computer device, a number of checks written on a first account selected from the plurality of accounts from a most recent check order on the first account, wherein the number of checks written on the first account from the most recent check order on the first account comprises a number of checks cleared on the first account and a number of stop payment orders made on the first account;
    determining, using the computer device, a check usage rate for the first account, wherein the check usage rate for the first account is proportional to a number of checks written on the first account per unit time;
    determining, using the computer device, a time-to-exhaustion for the first account considering the number of checks written on the first account and the check usage rate for the first account;
    when the time-to-exhaustion for the first account drops below a threshold, initiating, using the computer device, an order of new checks directed to a customer associated with the first account
    determining, using the computer device, a number of checks written on a second account selected from the plurality of accounts from a most recent check order on the second account, wherein the number of checks written on the second account from the most recent check order on the second account comprises a number of checks cleared on the second account and a number of stop payment orders made on the second account;
    determining, using the computer device, a check usage rate for the second account, wherein the check usage rate for the second account is proportional to a number of checks written on the second account per unit time;
    determining, using the computer device, a time-to-exhaustion for the second account considering the number of checks written on the second account and the check usage rate for the second account; and
    when the time-to-exhaustion for the second account drops below the threshold, initiating, using the computer device, an order of new checks directed to a customer associated with the second account.

2. The method of claim 1, further comprising determining a number of checks remaining for the first account, wherein the number of checks remaining is determined considering the number of checks written on the account and an amount of checks provided to the customer in a previous order.

3. The method of claim 2, further comprising initiating the order of new checks for the first account when the number of checks remaining for the first account drops below a second threshold.

4. The method of claim 1, further comprising sending a reminder notice to the customer associated with the first account when the time-to-exhaustion for the first account drops below a third threshold, wherein the third threshold is greater than the first threshold.

5. The method of claim 1, further comprising sending an order notice to the customer associated with the first account upon initiating the order of new checks directed to the customer associated with the first account.

6. The method of claim 1, further comprising displaying a user interface to the customer associated with the first account, wherein the user interface provides to the customer associated with the first account information describing:
    an indication of a number of checks written on the first account from the most recent check order on the first account;
    an indication of when a new order will be initiated on the first account, the indication comprising at least one of an estimated amount of time until the new order on the first account will be initiated and a number of checks to be written on the first account before the new order on the first account will be initiated.

7. The method of claim 6, wherein the user interface further provides to the customer associated with the first account information describing a number of checks remaining on the first account.

8. The method of claim 6, wherein displaying the user interface to the customer associated with the first account comprises serving the user interface to a client system selected from the group consisting of an automatic teller machine, a personal computer, a mobile phone, and a personal digital assistant.

9. The method of claim 1, further comprising verifying an address of the customer associated with the first account prior to initiating the order of new checks directed to the customer associated with the first account.

10. The method of claim 1, wherein verifying the address of the customer associated with the first account comprises comparing a first address of the customer associated with the first account with a second address of the customer associated with the first account received from a check printer system.

11. The method of claim 1, wherein initiating an order of new checks directed to the customer associated with the first account comprises sending an order request to a check printer system.

12. The method of claim 1, wherein determining a number of checks written on the first account from a most recent check order on the first account comprises receiving a report from a third party check processing system.

13. The method of claim 12, wherein the report from the third party check processing system comprises an indication of a number of checks cleared on the first account and a number of stop payment orders made on the first account.

14. A system for automatically reordering checks for a plurality of accounts utilizing checks, the system comprising:
- a bank host system, wherein the bank host system comprises at least one processor programmed to:
  - determine a number of checks written on a first account selected from the plurality of accounts from a most recent check order on the first account, wherein the number of checks written on the first account from the most recent check order comprises a number of checks cleared on the first account and a number of stop payment orders made on the first account;
  - determine a check usage rate for the first account, wherein the check usage rate for the first account is proportional to a number of checks written on the first account per unit time;
  - determine a time-to-exhaustion for the first account considering the number of checks written on the first account and the check usage rate for the first account; and
  - when the time-to-exhaustion for the first account drops below a threshold, request an order of new checks directed to a customer associated with the first account
  - determine a number of checks written on a second account selected from the plurality of accounts from a most recent check order on the second account, wherein the number of checks written on the second account from the most recent check order comprises a number of checks cleared on the second account and a number of stop payment orders made on the second account;
  - determine a check usage rate for the second account, wherein the check usage rate for the second account is proportional to a number of checks written on the second account per unit time;
  - determine a time-to-exhaustion for the second account considering the number of checks written on the second account and the check usage rate for the second account;
  - when the time-to-exhaustion for the second account drops below the threshold, request an order of new checks directed to a customer associated with the second account.

15. The system of claim 14, wherein the at least one processor is further programmed to determine a number of checks remaining on the first account, wherein the number of checks remaining on the first account is determined considering the number of checks written on the first account and an amount of checks provided to the customer associated with the first account in a previous order.

16. The system of claim 15, wherein the at least one processor is further programmed to initiate the order of new checks for the first account when the number of checks remaining for the first account drops below a second threshold.

17. The system of claim 14, wherein the at least one processor is further programmed to send a reminder notice to the customer associated with the first account when the time-to-exhaustion for the first account drops below a third threshold, wherein the third threshold is greater than the first threshold.

18. The system of claim 14, further comprising sending an order notice to the customer associated with the first account upon initiating the order of new checks directed to the customer associated with the first account.

19. The system of claim 14, wherein the at least one processor is further programmed to serve a user interface to a client system of the customer associated with the first account, wherein the user interface provides to the client system information describing:
- an indication of a number of checks written on the first account from the most recent check order on the first account;
- an indication of when the new order on the first account will be initiated comprising at least one of an estimated amount of time until the new order on the first account will be initiated and a number of checks to be written on the first account before the new order on the first account will be initiated.

20. The method of claim 19, wherein the user interface further provides to the client system information describing a number of checks remaining on the first account.

21. The method of claim 19, wherein the client system is selected from the group consisting of an automatic teller machine, a personal computer, a mobile phone, and a personal digital assistant.

* * * * *